United States Patent [19]

Wienchol

[11] Patent Number: 5,660,429
[45] Date of Patent: Aug. 26, 1997

[54] WIND DEFLECTOR ARRANGEMENT FOR A MOTOR VEHICLE ROOF

[75] Inventor: Otto Wienchol, Pullach, Germany

[73] Assignee: Webasto Karosseriesysteme GmbH, Germany

[21] Appl. No.: 575,544

[22] Filed: Dec. 20, 1995

[30] Foreign Application Priority Data

Dec. 22, 1994 [DE] Germany ............... 44 46 016.3

[51] Int. Cl.$^6$ ............................................. B60J 7/22
[52] U.S. Cl. ................................................ 296/217
[58] Field of Search ........................................ 296/217

[56] References Cited

U.S. PATENT DOCUMENTS 4,630,859  12/1986  Bienert et al. ............... 296/217
5,052,745  10/1991  Preiss ............................ 296/217

FOREIGN PATENT DOCUMENTS 3925808  2/1991  Germany ..................... 296/217

*Primary Examiner*—Dennis H. Pedder
*Attorney, Agent, or Firm*—Sixbey, Friedman, Leedom & Ferguson, P.C.; David S. Safran

[57] ABSTRACT

Wind deflector arrangement for a motor vehicle roof which has a roof opening which can be closed by a movable cover and a pivoting wind deflector which is located along the front edge of the roof opening. The wind deflector has a wind deflector body and a free edge section which forms the end edge of the wind deflector and which is inserted into a receiver which is formed on the wind deflector body. The wind deflector body is designed as a universal base section and the free edge section is selected from a group of variously designed free edge sections which can be selectively inserted into the receiver.

10 Claims, 3 Drawing Sheets

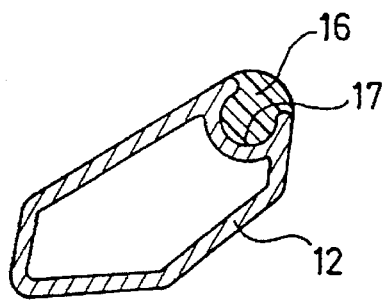
FIG. 2
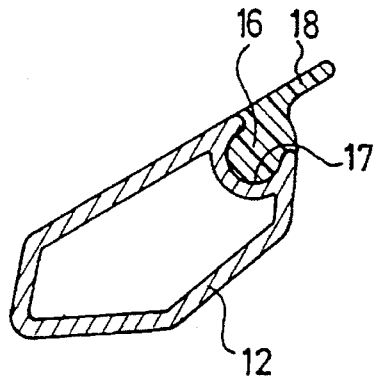 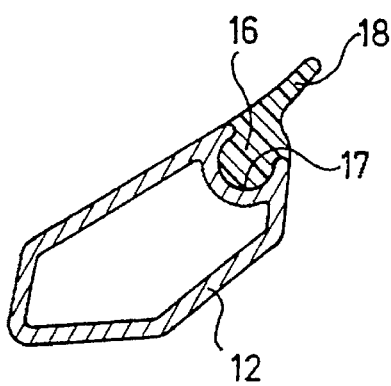 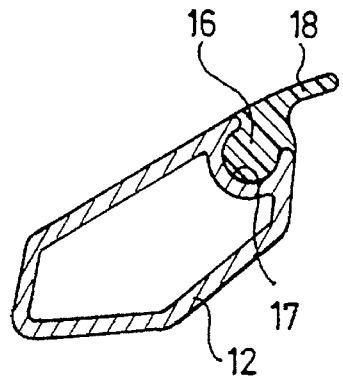
FIG.3(a)   FIG.3(b)   FIG.3(c)
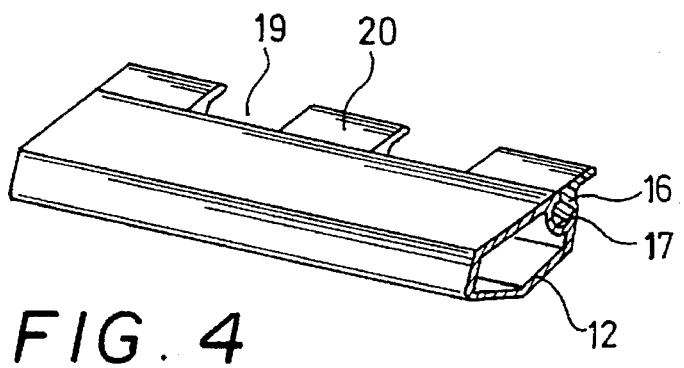
FIG. 4

WIND DEFLECTOR ARRANGEMENT FOR A MOTOR VEHICLE ROOF

BACKGROUND OF THE INVENTION

1. Field of the Invention

The invention relates to a wind deflector arrangement for a motor vehicle roof which has a roof opening which can be closed by a movable cover and a pivoting wind deflector which is located along the front edge of the roof opening, the wind deflector having a wind deflector body and a end section which is inserted into a receiver which is formed on the wind deflector body.

2. Description of Related Art

In many motor vehicle roofs with a roof opening which can be closed by a movable cover, a wind deflector is used which swings upward when the cover is opened. To facilitate matching of the wind deflector to the different vehicle roofs, it has been suggested (U.S. patent application Ser. No. 4,630,859) that the body of the wind deflector be formed at least partially from a section part with each side edge being covered by an end piece. Thus, at least the middle part of the wind deflector body is formed by a section part which is cut off, depending on the desired size of the roof opening, from a section part which can be supplied as running length stock, e.g., an extruded profile, In one embodiment of the known wind deflector arrangement, the front area of the wind deflector body is form fitted to a rubber or plastic section part which represents the rear area which lies topmost when the wind deflector is in a raised, operational position, i.e., the free edge section of the wind deflector body.

One general requirement for wind deflectors for motor vehicle roofs is to minimize the wind noise caused when the movable cover is opened. It has been found that reducing this disturbing wind noise depends very heavily on the free edge section of the wind deflector. However, unfortunately, the best suited shape of the free edge section cannot be theoretically predicted using computations, for example, but it must be experimentally determined. In the known wind deflector arrangements, however, a change of the free edge section is associated with considerable cost; this often leads to the manufacturers of wind deflectors being satisfied with nonoptimum designs, since value of further refinement of the design of the free edge section would not offset the related experimental and economic cost. Moreover, the most favorable shape for the free edge section is different for different vehicle roofs.

SUMMARY OF THE INVENTION

The primary object of the present invention is to facilitate formation of wind deflectors with suitable free edge sections and to enable optimum matching of the wind deflector to a given vehicle roof in an economical manner.

This object is achieved in this invention by the fact that the wind deflector body is designed as a universal base section and a free edge section is selected from a group of variously designed free edge sections which can be selectively inserted into the receiver.

In particular, the wind deflector body can have a middle piece and two end pieces which adjoin it in order to be able to easily match the width of the wind deflector arrangement to roof openings of various width.

The middle piece of the wind deflector body can be made of an extruded section, preferably as a lightweight metal extruded section, and the free edge sections can be made of rubber or plastic.

Furthermore, at least the middle section of the wind deflector body can be made as a hollow section, by which the weight of the wind deflector body can be kept low.

In certain cases it may be preferable to use a free edge section which has recesses, instead of a free edge section with continuous cross section. In such a case, several individual free edge sections can be used, the individual free edge sections having different cross sections.

These and further objects, features and advantages of the present invention will become apparent from the following description when taken in connection with the accompanying drawings which, for purposes of illustration only, show several embodiments in accordance with the present invention.

BRIEF DESCRIPTION OF THE DRAWINGS

FIG. 2 is a cross-sectional view of a wind deflector body and a free edge section mounted thereto;

FIG. 3(a) through (c) show cross sections through a wind deflector body with different free edge sections having an elongated projecting surface;

FIG. 4 shows a perspective view of a wind deflector body, into the receiver of which a free edge section with recesses has been inserted;

DETAILED DESCRIPTION OF THE PREFERRED EMBODIMENTS

Figure 1:
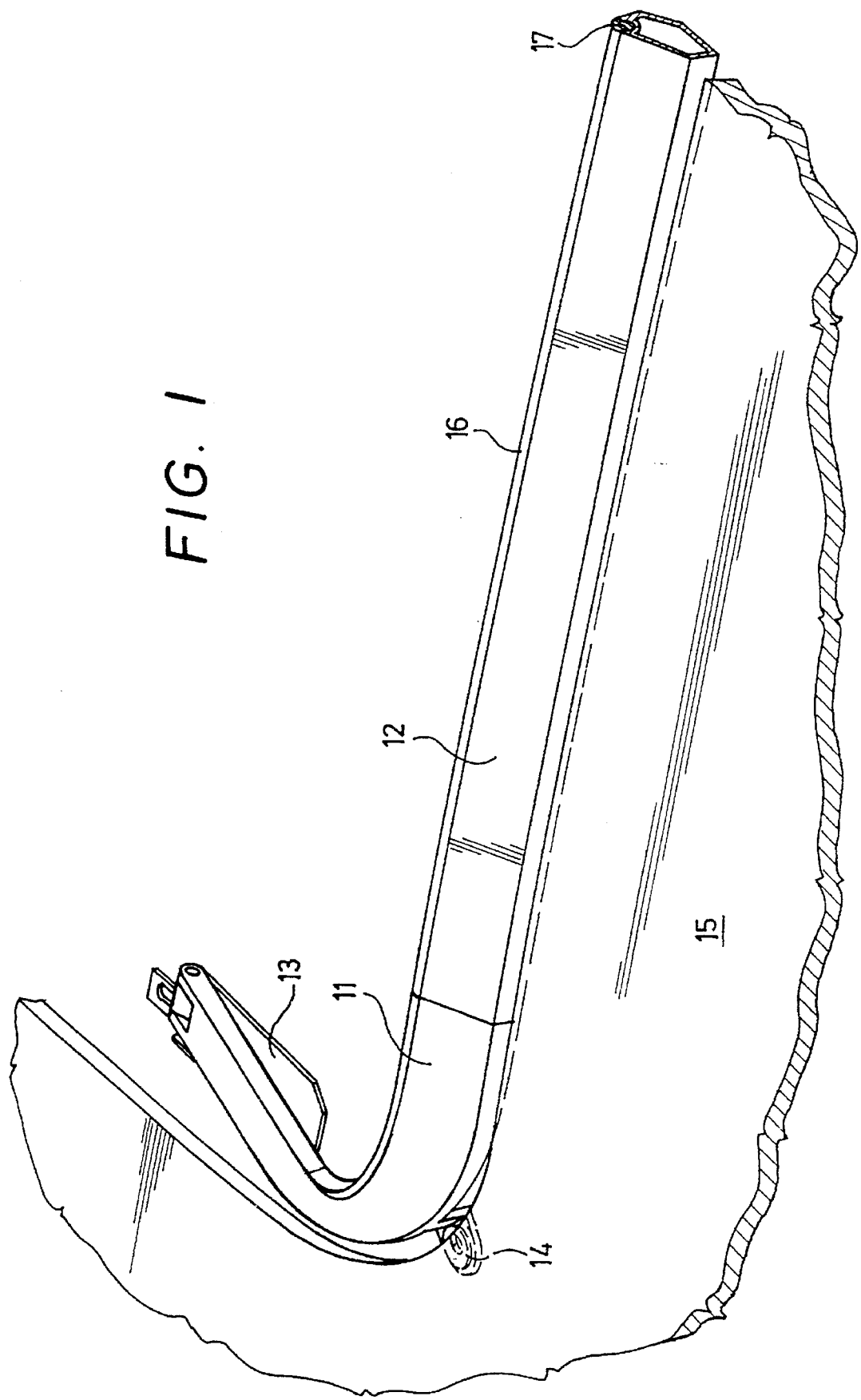
FIG. 1 shows a schematic perspective View of a section of a wind deflector with a continuous free edge section in a raised position relative to a fixed vehicle roof surface.

FIG. 1 shows a wind deflector in accordance with the present invention. The wind deflector has a body formed of two end pieces 11 (of which only one can be seen in FIG. 1) joined to a respective end of a middle piece 12. The wind deflector is raised upward by a spring 13 when a roof cover (not shown), for example, a sliding cover, is opened. A stop 14 is attached to wind deflector end pieces 11 and engages against the underside of a fixed vehicle roof 15 to thus limit the upward motion of the wind deflector. When the roof cover is closed, the wind deflector is pressed back down against the force of spring 13. The free edge of the wind deflector body is formed by a free edge section 16 which is held in a receiver 17, such as a groove which is formed at least in middle piece 12 and if necessary also in at least a portion of end pieces 11.

FIG. 2 shows a cross section through a wind deflector body with a free edge section 16 inserted therein. The cross section shown in FIG. 2 applies primarily to middle piece 12 of the wind deflector. However, it goes without saying that at least those portions of the end pieces 11 which adjoin the middle piece 12 can have the same or similar cross section. In the embodiment shown in FIG. 2, the middle piece 12 is made as a hollow section in order to keep the weight of the wind deflector low. Preferably, middle piece 12 is made as a lightweight metal extruded section shaped to provide the receiver 17 into which free edge section 16 is inserted. Different free edge sections 16 are made, preferably, of rubber or plastic. In the embodiment shown in FIG. 2, the free edge section 16 Has a shape which is dimensioned such that, when seated in the receiver 17, a rounded contour is provided that lies flush with the adjoining external surfaces of the wind deflector body.

FIGS. 3(a) through 3(c), likewise, show a cross section of the middle piece 12 of the wind deflector body; however, in these embodiments, the free edge section 16 is formed with an elongated projecting surface 18, the lo free edge sections 16 of FIGS. 3(b) and 3(c) differing from that of 3(a) only by the projecting surface 18 being inclined upwardly and downwardly, respectively, i.e., as in FIG. 1, edge sections 16 run continuously along the length of the middle section 12 and optionally into the adjoining portion of the end sections 11. If the wind deflector is mounted in a special vehicle roof, in which it is provided that the wind deflector Has a free edge section with a projecting surface, by replacing the individual free edge sections according to FIGS. 3(a) through 3(c), the optimum shape of the free edge section can be determined. It goes without saying that the shape of the free edge sections is in no way limited to those shown, and it is only necessary that they agree in the cross sectional shape of the area to be inserted into the receiver 17.

Figure 5:
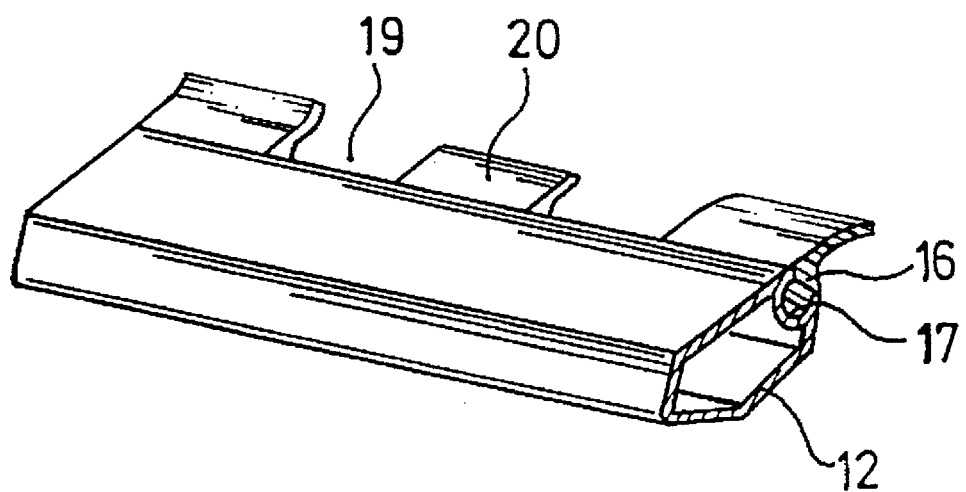
FIG. 5 is a view corresponding to that of FIG. 4, but with the individual free edge sections having different cross sections.

FIG. 4 shows a free edge section 16 which differs from the free edge sections 16 shown in FIGS. 3(a) to 3(c) by the provision of recesses 19 in the elongated projecting surface 18. It goes without saying that the shape of the recesses is in no way limited,. so that remaining individual front surfaces 20 can assume any desired shape, for example, right-angled, trapezoidal, semicircular, etc. In certain cases it may be preferable to use a free edge section which has recesses, instead of a free edge section with continuous cross section. In such a case, several individual free edge sections can be used, the individual free edge sections having different cross sections, as can be seen in FIG. 5 where, viewed left to right, the profiles of FIGS. 3(a), (b) & (c) are present on the same edge section.

In this description, the invention has been applied to a wind deflector arrangement which, when the roof cover is opened, is pushed upward around a pivot axis which is in the rear part of the wind deflector arrangement in the vehicle direction (FIG. 1); nonetheless, when raised, due to the profile configuration, the top-rear edge of the wind deflector body is uppermost when raised (see also FIGS. 2 & 3). However, the invention can, of course, be applied to any other wind deflector arrangement, for example, to a wind deflector arrangement with pivot axis in the front, as is shown in the initially mentioned U.S. patent application Ser. No. 4,630,859.

I claim:

1. Wind deflector arrangement for a motor vehicle roof which has a roof opening which can be closed by a movable cover and a pivoting wind deflector which is located along the front edge of the roof opening, the wind deflector having a wind deflector body with a free edge section which is mounted in a receiver which is provided in the wind deflector body for forming an uppermost edge of the wind deflector in a raised, operational position thereof when the movable cover is moved to open the roof opening; wherein wind deflector body comprises a universal base section having said receiver at an edge area thereof; and wherein a plurality of free edge sections are provided, each of which is differently shaped and each of which is selectively mountable in the receiver for matching of the wind deflector to a variety of different vehicle roofs in manner acting to minimize wind noise in the operational position thereof for each of said roofs.

2. Wind deflector arrangement for a motor vehicle roof according to claim 1, wherein the wind deflector body has middle piece and two end pieces, each of which is attached to a respective lateral side of the middle piece.

3. Wind deflector arrangement for a motor vehicle roof according to claim 2, wherein the middle piece of the wind deflector body is made of an extruded section.

4. Wind deflector arrangement for a motor vehicle roof according to claim 2, wherein at least the middle piece of the wind deflector body is made of a hollow section.

5. Wind deflector arrangement for a motor vehicle roof according to claim 1, wherein the free edge section is made of rubber.

6. Wind deflector arrangement for a motor vehicle roof according to claim 1, wherein the free edge section is made of plastic.

7. Wind deflector arrangement for a motor vehicle roof according to claim 1, wherein the free edge section has recesses.

8. Wind deflector arrangement for a motor vehicle roof according to claim 1, wherein an end edge of the wind deflector body is formed by several individual free edge sections having different cross sections.

9. Wind deflector arrangement for a motor vehicle roof according to claim 1, wherein at least one of said plurality of free edge sections has a projecting surface portion that extends outwardly from a portion of the free edge section which mates with the receiver of the wind deflector body.

10. Wind deflector arrangement for a motor vehicle roof according to claim 9, wherein several of said plurality of free edge sections have a projecting surface portion that extends outwardly from a portion of the free edge section which mates with the receiver of the wind deflector body, the projecting surface portions thereof extending at a different angle of inclination relative to the portion of the free edge section which mates with the receiver, and thus, with the base section when installed.

* * * * *